(12) United States Patent
Jindal et al.

(10) Patent No.: US 12,143,284 B1
(45) Date of Patent: Nov. 12, 2024

(54) HEALTH CHECK AS A SERVICE

(71) Applicant: VMware LLC, Palo Alto, CA (US)

(72) Inventors: Gaurav Jindal, Pune (IN); Neeraj Mantri, Pune (IN); Aditya Vikram Mukherjee, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/228,696

(22) Filed: Aug. 1, 2023

(30) Foreign Application Priority Data

Jun. 1, 2023 (IN) .............................. 202341037810

(51) Int. Cl.
| | |
|---|---|
| *G06F 15/173* | (2006.01) |
| *H04L 41/082* | (2022.01) |
| *H04L 41/0895* | (2022.01) |
| *H04L 43/022* | (2022.01) |
| *H04L 43/067* | (2022.01) |
| *H04L 43/12* | (2022.01) |
| *H04L 41/50* | (2022.01) |

(52) U.S. Cl.
CPC .......... *H04L 43/067* (2013.01); *H04L 41/082* (2013.01); *H04L 41/0895* (2022.05); *H04L 43/022* (2013.01); *H04L 43/12* (2013.01); *H04L 41/50* (2013.01)

(58) Field of Classification Search
CPC ..... H04L 43/067; H04L 43/022; H04L 43/12; H04L 41/0895; H04L 41/082; H04L 41/50

USPC .................................................. 709/223–224
See application file for complete search history.

(56) References Cited

U.S. PATENT DOCUMENTS

| | | | |
|---|---|---|---|
| 10,135,916 B1 * | 11/2018 | Farhangi .............. | H04L 43/0817 |
| 10,523,541 B2 * | 12/2019 | Rao ...................... | H04L 41/0893 |
| 10,542,071 B1 * | 1/2020 | Matthews ............... | H04L 43/10 |
| 2019/0199611 A1 * | 6/2019 | Kotadia .............. | H04L 43/0817 |
| 2020/0244556 A1 * | 7/2020 | Shevade ............. | H04L 41/0654 |
| 2022/0124004 A1 * | 4/2022 | Holla ...................... | H04L 41/12 |
| 2023/0283559 A1 * | 9/2023 | MacCarthaigh ........ | H04L 47/19 709/223 |

* cited by examiner

*Primary Examiner* — Bharat Barot
(74) *Attorney, Agent, or Firm* — King Intellectual Asset Management

(57) ABSTRACT

Example methods and systems for health check as a service are described. One example may involve a computer system receiving a request to perform a health check for a network environment that includes a set of multiple flows. The computer system may select a subset that includes (a) a first flow between a first pair of endpoints and (b) a second flow between a second pair of endpoints. The health check may be initiated for the first flow and the second flow by generating and sending (a) a first instruction to cause injection of a first health check packet, and (b) a second instruction to cause injection of a second health check packet. The computer system may determine health status information associated with the subset based on (a) first observation information triggered by the first health check packet, and (b) second observation information triggered by the second health check packet.

21 Claims, 8 Drawing Sheets

HEALTH CHECK AS A SERVICE

RELATED APPLICATIONS

Benefit is claimed under 35 U.S.C. 119(a)-(d) to Foreign Application Serial No. 202341037810 filed in India entitled "HEALTH CHECK AS A SERVICE", on Jun. 1, 2023, by VMware, Inc., which is herein incorporated in its entirety by reference for all purposes.

BACKGROUND

Virtualization allows the abstraction and pooling of hardware resources to support virtual machines in a software-defined data center (SDDC). For example, through server virtualization, virtualization computing instances such as virtual machines (VMs) running different operating systems may be supported by the same physical machine (e.g., referred to as a "host"). Each VM is generally provisioned with virtual resources to run a guest operating system and applications. The virtual resources may include central processing unit (CPU) resources, memory resources, storage resources, network resources, etc. In practice, various network issues may affect traffic to/from VMs in the SDDC. It is desirable to perform health checks to identify and resolve those issues to improve host and network performance.

DETAILED DESCRIPTION

According to examples of the present disclosure, health check as a service may be implemented to facilitate network troubleshooting and diagnosis in a network environment, such as a software-defined networking (SDN) environment. In practice, examples of the present disclosure may be implemented to identify network issue(s) that might have been caused by a software deployment process (e.g., software upgrade). Alternatively or additionally, examples of the present disclosure may be implemented to facilitate on-demand health checks.

Figure 1:
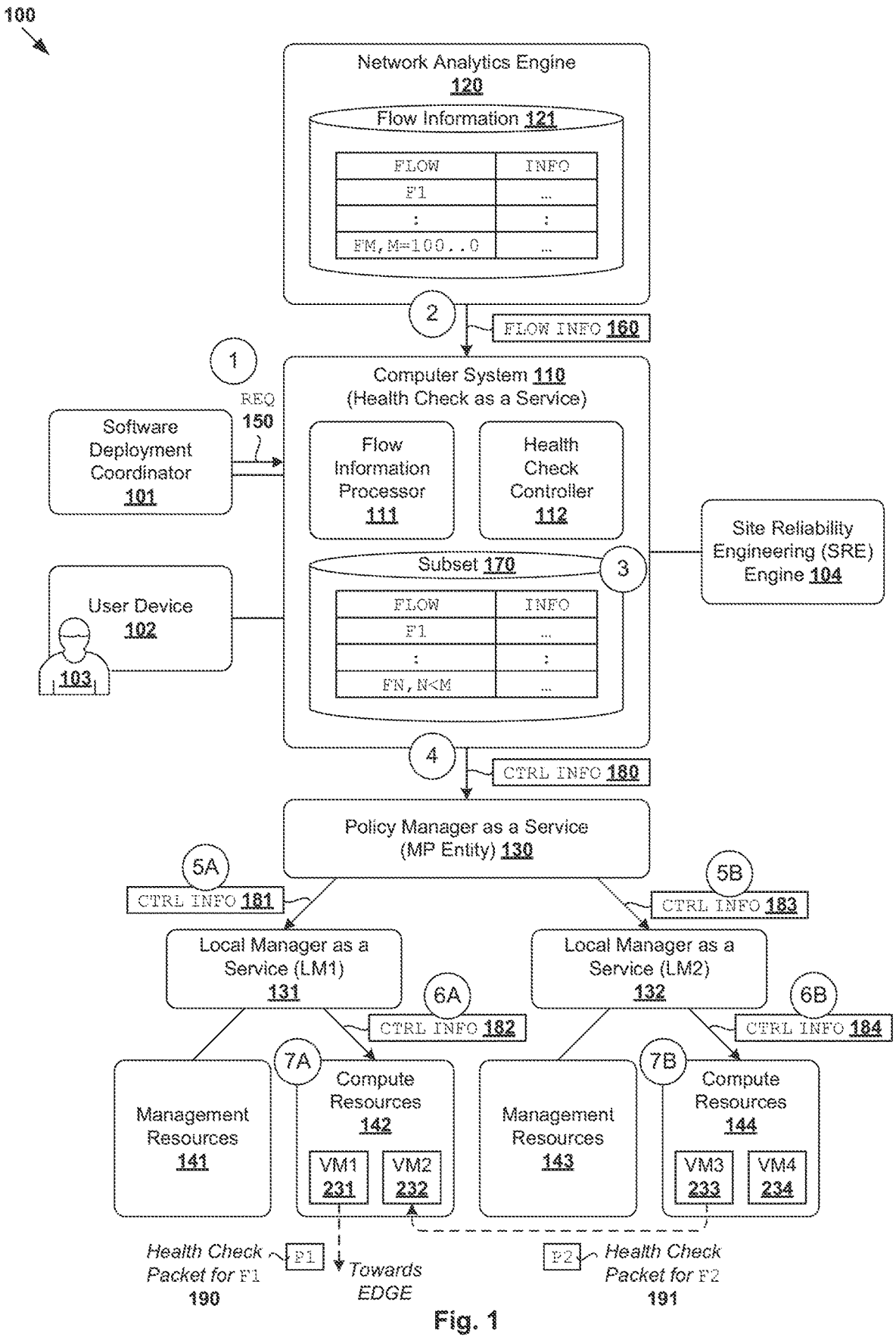
FIG. 1 is a schematic diagram illustrating example networking in which health check as a service may be performed.

One example may involve a computer system (see 110 in FIG. 1) receiving a request to perform a health check for a network environment that includes a set of multiple flows (see 150 in FIG. 1). The computer system may select, from the set of multiple flows, a subset for the health check by processing flow information associated with the set of multiple flows (see 160-170 in FIG. 1). For example, the subset may include (a) a first flow between a first pair of endpoints and (b) a second flow between a second pair of endpoints.

The computer system may then initiate the health check for at least the first flow and the second flow. This may involve generating and sending (a) a first instruction to a first entity to cause injection of a first health check packet for forwarding between the first pair of endpoints, and (b) a second instruction to the first entity or a second entity to cause injection of a second health check packet for forwarding between the second pair of endpoints (see 180-184 in FIG. 1). This way, the computer system may determine health status information associated with the subset based on (a) first report information triggered by the first health check packet, and (b) second report information triggered by the second health check packet (see 190-191 in FIG. 1).

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

FIG. 1 which is a schematic diagram illustrating example network environment 100 in which health check as a service may be performed. One example network environment will be explained using FIG. 2, which is a schematic diagram illustrating a physical implementation view of software-defined networking (SDN) environment 200. It should be understood that, depending on the desired implementation, network environment 100/200 may include additional and/or alternative components than that shown in FIGS. 1-2. Network environment 100/200 may also be referred to as a software-defined data center (SDDC). Although the terms "first" and "second" are used to describe various elements, these elements should not be limited by these terms. These terms are used to distinguish one element from another. For example, a first element may be referred to as a second element, and vice versa.

Referring first to FIG. 1, network environment 100 may include computer system 110 that is configured to perform health checks as a service. Computer system 110 may be in communication with network analytics engine 120 that is capable of collecting flow information associated with a set of multiple flows in network environment 100. Computer system 110 may be capable of interacting with various management entities, such as management plane (MP) entity 130, central control plane (CCP) entity 131/132. In network environment 100 that includes multi-site SDDC, MP entity 130 may be implemented using a policy manager as a service (PMaaS) entity, and CCP entity 131/132 using a local manager as a service (LMaaS) entity (referred to as LM).

Management entities 130-132 may manage any suitable management resources (see 141, 143) and compute resources (see 142, 144). For example, first local manager 131 ("LM1") may manage first compute resources 142 that include virtual machines (VMs) 231-232. In another example, second local manager 132 ("LM2") may manage second compute resources 144 that include VMs 233-234. For a single-site data center, MP entity 130 and CCP entity 131/132 may be implemented using respective NSX® Manager and Controller available from VMware, Inc.

Example endpoints in the form of VMs 231-234 will be explained further using FIG. 2. Depending on the desired implementation, examples of the present disclosure may be implemented in any suitable SDN environment 200 or SDDC. SDN environment 200 may include private and/or public cloud environment(s) spanning a single or multiple geographical sites. For example, some VMs 231-232 may be located at a first geographical site, and other VMs 233-234 at a second geographical site. In practice, the term "private cloud environment" may refer generally to an on-premises data center or cloud platform supported by infrastructure that is under an organization's private ownership and control. In contrast, the term "public cloud environment" may refer generally a cloud platform supported by infrastructure that is under the ownership and control of public cloud provider(s) or hyperscaler(s).

In practice, a public cloud provider or hyperscaler is generally an entity that offers a cloud-based platform to multiple users or tenants. This way, a user may take advantage of the scalability and flexibility provided by public cloud environment 102 for data center capacity extension, disaster recovery, etc. Depending on the desired implementation, public cloud environment 102 may be implemented using any suitable cloud technology, such as Amazon Web Services® (AWS) and Amazon Virtual Private Clouds (VPCs); VMware Cloud™ on AWS; Microsoft Azure®; Google Cloud Platform™, IBM Cloud™; a combination thereof, etc. Amazon VPC and Amazon AWS are registered trademarks of Amazon Technologies, Inc.

Physical Implementation View

Referring also to FIG. 2B, SDN environment 200 may include hosts 210A-B to support VMs 231-234. For example, host-A 210A may support VM1 231 and VM2 232 under the management of LM1 131 and PMaaS entity 130. Host-B 210B may support VM3 233 and VM4 234 under the management of LM2 132 and PMaaS entity 130. To send or receive control information, a local control plane (LCP) agent (not shown) on host 210A/210B may interact with LM 131/132 via a control-plane channel.

Host 210A/210B may include suitable hardware 212A/212B and virtualization software (e.g., hypervisor-A 214A, hypervisor-B 214B). Hardware 212A/212B includes suitable physical components, such as central processing unit(s) (CPU(s)) or processor(s) 220A/220B; memory 222A/222B; physical network interface controllers (PNICs) 224A/224B; and storage disk(s) 226A/226B, etc. Hypervisor 214A/214B maintains a mapping between underlying hardware 212A/212B and virtual resources allocated to respective VMs. Virtual resources are allocated to respective VMs 231-234 to support a guest operating system (OS) and application(s); see 241-244, 251-254.

For example, the virtual resources may include virtual CPU, guest physical memory, virtual disk, virtual network interface controller (VNIC), etc. Hardware resources may be emulated using virtual machine monitors (VMMs). For example in FIG. 2, VNICs 261-264 are virtual network adapters for VMs 231-234, respectively, and are emulated by corresponding VMMs (not shown) instantiated by their respective hypervisor at respective host-A 210A and host-B 210B. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 214A-B may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" may refer generally to a link layer or media access control (MAC) layer; "layer-3" a network or Internet Protocol (IP) layer; and "layer-4" a transport layer (e.g., using Transmission Control Protocol (TCP), User Datagram Protocol (UDP), etc.), in the Open System Interconnection (OSI) model, although the concepts described herein may be used with other networking models.

Through virtualization of networking services in SDN environment 200, logical networks (also referred to as overlay networks or logical overlay networks) may be provisioned, changed, stored, deleted and restored programmatically without having to reconfigure the underlying physical hardware architecture. Hypervisor 214A/214B implements virtual switch 215A/215B and logical distributed router (DR) instance 217A/217B to handle egress packets from, and ingress packets to, VMs 231-234. In SDN environment 200, logical switches and logical DRs may be implemented in a distributed manner and can span multiple hosts.

For example, a logical switch (LS) may be deployed to provide logical layer-2 connectivity (i.e., an overlay network) to VMs 231-234. A logical switch may be implemented collectively by virtual switches 215A-B and represented internally using forwarding tables 216A-B at respective virtual switches 215A-B. Forwarding tables 216A-B may each include entries that collectively implement the respective logical switches. Further, logical DRs that provide logical layer-3 connectivity may be implemented collectively by DR instances 217A-B and represented internally using routing tables (not shown) at respective DR instances 217A-B. Each routing table may include entries that collectively implement the respective logical DRs.

Packets may be received from, or sent to, each VM via an associated logical port. For example, logical switch ports 265-268 (labelled "LP1" to "LP4") are associated with respective VMs 231-234. Here, the term "logical port" or "logical switch port" may refer generally to a port on a logical switch to which a virtualized computing instance is connected. A "logical switch" may refer generally to an SDN construct that is collectively implemented by virtual switches 215A-B, whereas a "virtual switch" may refer generally to a software switch or software implementation of a physical switch. In practice, there is usually a one-to-one mapping between a logical port on a logical switch and a virtual port on virtual switch 215A/215B. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

A logical overlay network may be formed using any suitable tunneling protocol, such as Virtual extensible Local Area Network (VXLAN), Stateless Transport Tunneling (STT), Generic Network Virtualization Encapsulation (GENEVE), Generic Routing Encapsulation (GRE), etc. For example, VXLAN is a layer-2 overlay scheme on a layer-3 network that uses tunnel encapsulation to extend layer-2 segments across multiple hosts which may reside on different layer 2 physical networks. Hypervisor 214A/214B may implement virtual tunnel endpoint (VTEP) (not shown) to encapsulate and decapsulate packets with an outer header (also known as a tunnel header) identifying the relevant logical overlay network. Hosts 210A-B may maintain data-plane connectivity with each other via physical network 205 to facilitate east-west communication among VMs 231-234.

Figure 2:
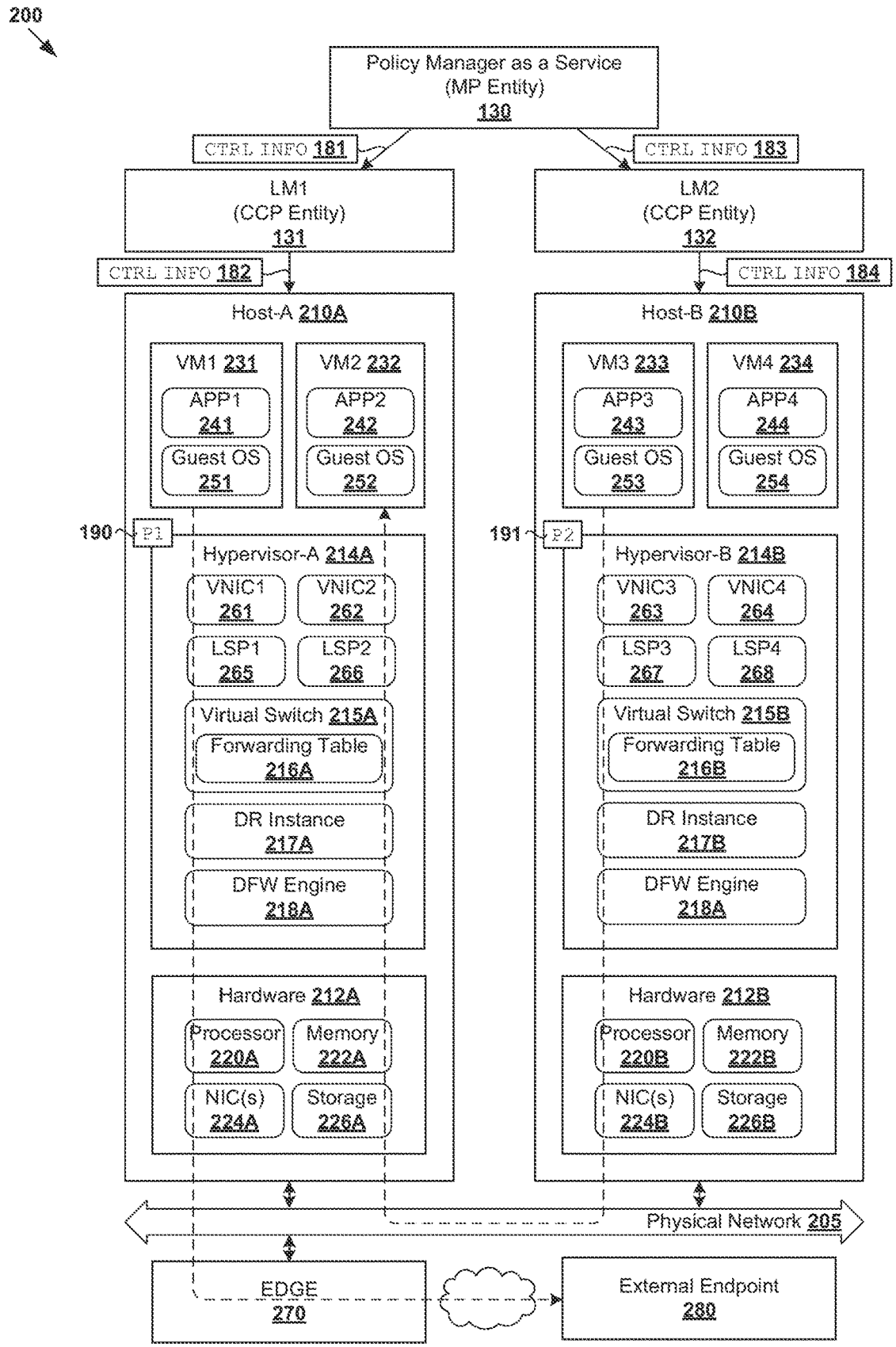
FIG. 2 is a schematic diagram illustrating a physical implementation view of a software-defined networking (SDN) environment.

To facilitate north-south traffic forwarding, hosts 210A-B may maintain data-plane connectivity with EDGE 270 in FIG. 2 via physical network 205, such as between a VM (e.g., VM1 231) and external endpoint 280 on an external network (e.g., Internet). In practice, EDGE 270 may be an entity that is implemented using one or more VMs and/or physical machines (known as "bare metal machines"), and capable of performing functionalities of a switch, router, bridge, gateway, edge appliance, etc. EDGE 270 may implement a logical service router (SR) to provide networking services, such as gateway service, domain name system (DNS) forwarding, IP address assignment using dynamic host configuration protocol (DHCP), source network address translation (SNAT), destination NAT (DNAT), deep packet inspection, etc. When acting as a gateway, an EDGE node may be considered to be an exit point to an external network.

In practice, software deployment may be performed in network environment 100/200 from time to time to release the latest features and services to users, such as to deploy new software (greenfield deployment) or an upgrade to existing software, etc. The deployment, however, may potentially cause issues that affect production traffic and in some cases breach service level agreements (SLAs). This may be due to stack changes and other issues that may not have been found during pre-deployment testing. Further, there might be unforeseen issues because each customer environment is generally different in terms of applications, services and traffic types. As the scale and complexity of network environment 100/200 increases, network troubleshooting and diagnosis may become increasingly time- and resource-consuming. This may in turn increase system downtime due to undiagnosed issues, which is undesirable.

Health Check as a Service

According to examples of the present disclosure, health check as a service may be implemented to improve network troubleshooting and diagnosis in network environment 100/200. Examples of the present disclosure may be implemented to perform health checks to facilitate a software deployment process and/or on-demand health checks. For example, health checks may be performed to identify and detect issues or failures post upgrade in a data center or in a greenfield software development. Health checks may be performed for any suitable traffic types, such as north-south traffic (e.g., between VM1 231 and external endpoint 280 via EDGE 270 in FIG. 2), east-west traffic (e.g., between VM2 232 and VM3 233 in FIG. 2), etc.

Figure 3:
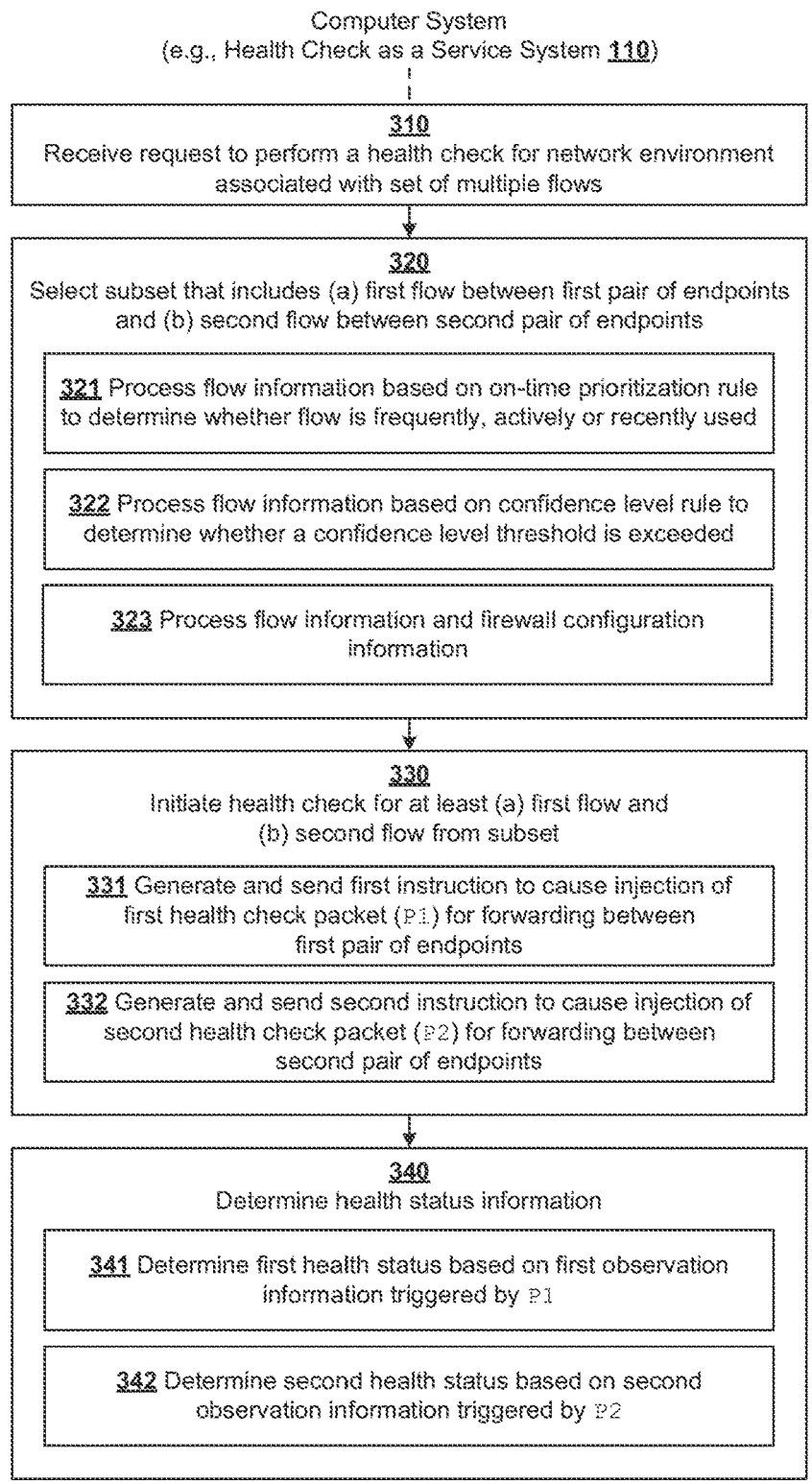
FIG. 3 is a flowchart of an example process for a computer system to perform health check as a service.

In more detail, FIG. 3 is a flowchart of example process 300 for computer system 110 to perform health check as a service in SDN environment 100. Example process 300 may include one or more operations, functions, or actions illustrated by one or more blocks, such as 310 to 342. The various blocks may be combined into fewer blocks, divided into additional blocks, and/or eliminated depending on the desired implementation. In the following, various examples will be discussed using example "first pair of endpoints" in the form of VM1 231 on host-A 210A and external endpoint 280, example "second pair of endpoints" in the form of VM2 232 on host-A 210A and VM3 233 on host-B 210B. Computer system 110 may include any suitable hardware and/or software component(s) to perform health check as a service, such as flow information processor 111 to perform blocks 310-320, health check controller 112 to perform blocks 330-340 and determine, etc.

At 310 in FIG. 3, computer system 110 may receive a request to perform a health check for network environment 100/200 associated with a set of multiple flows. Using the example in FIG. 1, the request may be received from deployment coordinator 101 that is configured to orchestrate a software deployment process. Alternatively, the request may be received from user device 102 operated by user 103 (e.g., network administrator) initiating an on-demand health check. See 150 in FIG. 1.

At 320 in FIG. 3, computer system 110 may select, from the set of multiple flows, a subset for the health check by processing flow information associated with the set of multiple flows. The subset may include (a) a first flow between a first pair of endpoints (e.g., VM1 231 and external endpoint 280) and (b) a second flow between a second pair of endpoints (e.g., VM2 232 and VM3 233). Using the example in FIG. 1, block 320 may be performed by processing flow information 121 obtained (e.g., received or retrieved) from network analytics engine 120. See 160-170 in FIG. 1.

Any suitable approach may be used for subset selection at block 320. For example, at 321, block 320 may include processing flow information 121 according to an on-time prioritization rule, such as to determine whether the first flow or the second flow is frequently used, actively used or recently used within a predetermined time frame. At 322, block 320 may include processing flow information 121 according to a confidence level rule, such as to determine whether a confidence level associated with the first flow or the second flow exceeds a threshold. At 323, block 320 may include processing flow information 121 to determine whether the first flow or the second flow is a critical flow (or associated with a critical service) based on firewall rule(s). These examples will be discussed further using FIG. 4.

At 330 in FIG. 3, computer system 110 may initiate health check for at least the first flow and the second flow from the subset. At 331, a first instruction may be generated and sent to a first entity (e.g., 130/131 in FIG. 1) to cause injection of a first health check packet (denoted as P1) for forwarding between the first pair of endpoints, such as VM1 231 and external endpoint 280. At 332, a second instruction may be generated and sent to the first entity or a second entity (e.g., 130/132 in FIG. 1) to cause injection of a second health check packet (denoted as P2) for forwarding between the second pair of endpoints, such as VM2 232 and VM3 233. See example instructions 180-184, and health check packets 190-191 in FIG. 1.

At 340 in FIG. 3, computer system 110 may determine health status information associated with the subset based on (a) first report information triggered by the first health check packet (P1 190), and (b) second report information triggered by the second health check packet (P2 191). The health status information may include a first health status associated with the first flow and a second health status associated with the second flow (see 341-342). As used herein, the term "report information" may refer generally to any suitable information generated by observation point(s) in response to detecting a health check packet. The report information may specify whether health check packet 190/191 has been received, forwarded, delivered, dropped (and reason for dropping where available), etc. Some examples will be discussed using FIGS. 5-6.

In practice, during and after a software deployment, there is general expectation that SLAs are not breached. Examples of the present disclosure may be implemented to perform health checks to reduce the impact and downtime caused by software deployments, such as due to runtime issues caused by bugs in software stack. Any suitable approach may be used to inject health check packets. For example, a tool called Traceflow (available from VMware, Inc.) may be extended to support health check as a service (also referred to as Traceflow as a service) according to examples of the present disclosure. Various examples will be explained below.

Subset Selection

Figure 4:
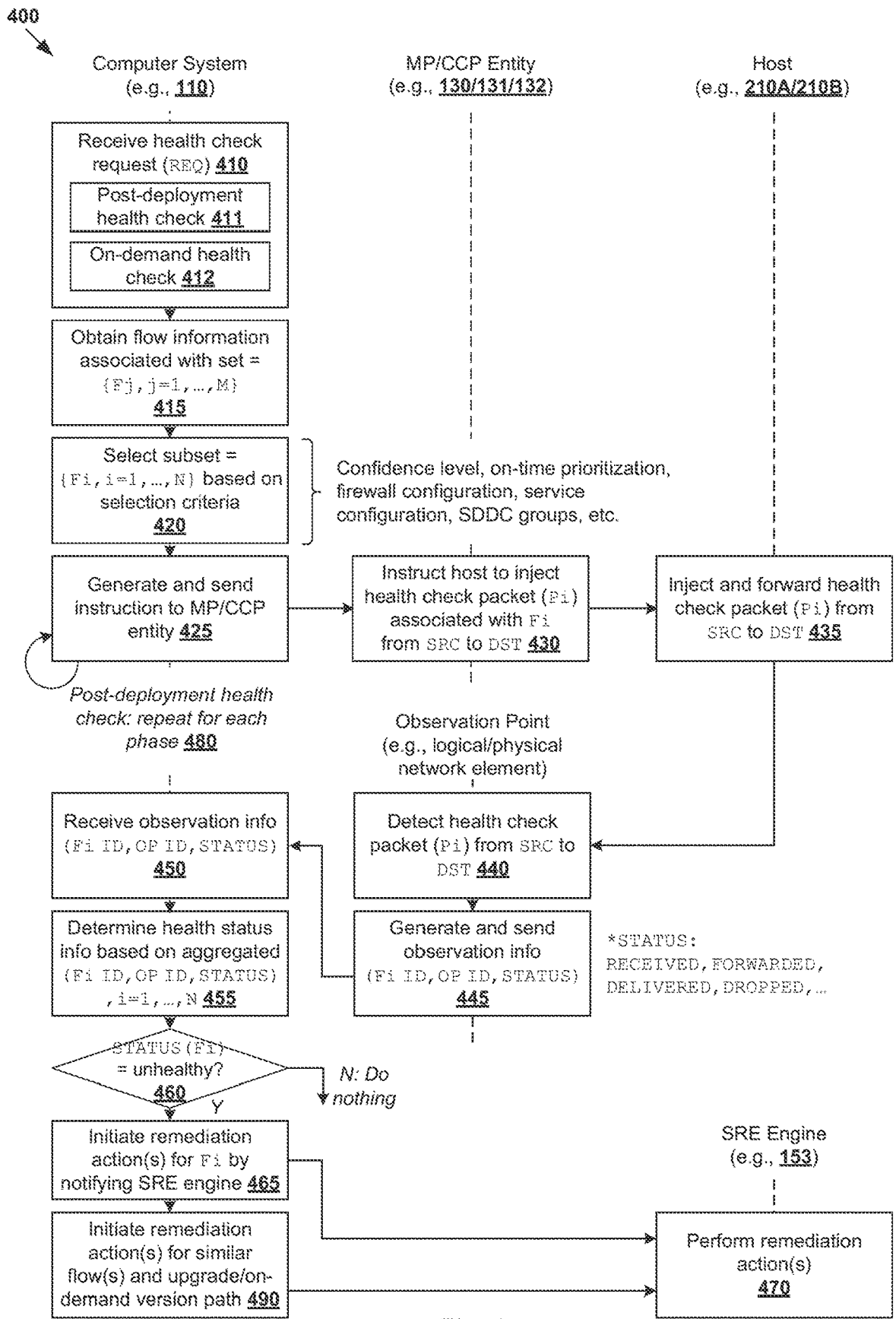
FIG. 4 is a flowchart of an example detailed process for health check as a service.

FIG. 4 is a flowchart of example detailed process 400 for health check as a service. Example process 400 may include one or more operations, functions, or actions illustrated at 410 to 490. The various operations, functions or actions may be combined into fewer blocks, divided into additional blocks, and/or eliminated depending on the desired implementation. The example in FIG. 4 will be explained using example network environment 100 in FIG. 1. Computer system 110 may provide health check as a service as a cloud-based tool that is accessible by deployment coordinator 101, user device 102, or any other requester, etc.

(a) Health Check Request

At 410 in FIG. 4, computer system 110 may receive a request to perform a health check for network environment 100 in which a set of multiple (M) flows denoted as $\{F_j, j=1, \ldots, M\}$ is detectable. The request may be received from any suitable source. In one example, the request may be received from deployment coordinator 101 to initiate a health check in conjunction with a software deployment process (e.g., software upgrade/greenfield deployment). In this case, the request may include information associated with the software deployment, such as network path(s) affected, one or more phases of the deployment, etc. See 411 in FIG. 4.

In another example, the request may be received from user device 102 operated by user 103 (e.g., network administrator) to initiate a health check on an on-demand basis. In practice, the request may be received from user 102 via any suitable interface supported by computer system 110, such as graphical user interface (GUI), command-line interface (CLI), application programming interface (API) calls, etc. Depending on the desired implementation, on-demand health checks may be requested manually or automatically (e.g., using scripts) at any suitable time interval to detect issues that may be affecting hosts 210A-B and VMs 231-234. See 412 in FIG. 4.

(b) Flow Information Processing

At 415 in FIG. 4, in response to receiving the request, computer system 110 may obtain flow information associated with the set of multiple (M) flows that are detectable in network environment 100. In the example in FIG. 1, flow information 121 may be obtained (e.g., received or retrieved) from network analytics engine 120 that is capable of identifying and monitoring the set of multiple (M) flows spread across multiple riles and components.

Network analytics engine 120 may be implemented using any suitable technology, such as VMware vRealize® Network Insight (VRNI)™, VMware NSX® Intelligence™, etc. Network analytics engine 120 may provide VRNI as a service (VRNIaaS) in a production environment for on-premises and/or cloud-based data center. Flow information 121 may be stored in any suitable format in a cloud database accessible by computer system 110, such as time series format, etc.

At 420 in FIG. 4, computer system 110 (e.g., using flow information processor 111) may process flow information 121 to select a subset (size=N) from the set of multiple (M) flows. Subset 170 (shown in FIG. 1) may be denoted as $\{F_i, i=1, \ldots, N\}$, where N<M. For example in a large SDDC, a subset of N=tens or hundreds of flows may be selected from M=millions or thousands of flows. In practice, the subset selection may be based on one or more selection criteria or rules, such as confidence level rule, on-time prioritization rule, firewall configuration rule, etc. Computer system 110 may select subset 170 by processing flow information 121 to identify services and/or critical flows in network environment 100.

In a first example, flow information 121 may be processed according to an on-time prioritization rule to determine whether a particular flow is one of most frequently used (e.g., frequency exceeding a threshold), most actively used or most recently used flows within a predetermined time frame. If yes, the flow may be selected and included in subset 170. Any suitable time frame may be configured, such as the last seven days, last three weeks, last one quarter, etc.

In a second example, flow information 121 may be processed according to a confidence level rule to determine whether a confidence level associated with a particular flow exceeds a user-configurable threshold (T). If yes, the flow may be selected and included in subset 170. The confidence level associated with a flow may be determined using artificial intelligence (AI), machine learning (ML) or rule-based engine(s). Any desired threshold may be defined for resources under the management of PMaaS entity 130 and/or LM 131/132. The confidence level may refer to the likelihood (e.g., expressed as a percentage) that the flow ($F_i$) is a critical flow. In practice, the confidence level may be derived from firewall rules that are configured to be matched with different flows. For example, a firewall rule may be matched to different flows based on parameters such as application information, port number information, traffic type, flow frequency, historical information, etc. A high confidence level may be derived from these parameters.

In a third example, flow information 121 may be processed according to a firewall configuration rule to determine whether a particular flow is a substantially critical flow based on firewall rule(s). For example in FIG. 2, firewall rule(s) for east-west and north-south traffic may be implemented by distributed firewall (DFW) engines 218A-B on respective hosts 210A-B and/or EDGE 270. In practice, it has been observed that 80-95% traffic may be allowed traffic, while the remaining 5-20% dropped traffic.

To identify critical flows, computer system 110 may also consider network configuration information associated with one or more of the following: critical management components, service configurations (e.g., VPN and VPN types), ad-hoc services (e.g., HCX and SRM), VMs, routing configuration, etc. Note that flow information processing may be performed (e.g., periodically) prior to receiving the request at block 410. In this case, subset selection may involve retrieving subset 170 from any suitable datastore accessible by computer system 110.

Health Status Information (a) Health Check Packets

At 425 in FIG. 4, computer system 110 (e.g., using health check controller 112) may generate and send instructions to cause injection of multiple health check packets to determine health status information associated with subset 170. Using the example in FIG. 1, subset 170 may include a first flow (F1) between VM1 231 on host-A 210A and external endpoint 270 via EDGE 270 (i.e., north-south traffic), and a second flow (F2) between VM2 232 on host-A 210A and VM3 233 on host-B 210B (i.e., east-west traffic). In practice, computer system 110 may send file bundle(s) or link(s) to MP entity 130 and/or LM 131/132 to cause health packet injection, such as LM1 bundle, LM1-LM2 bundle, external traffic bundle, etc.

In relation to the first flow, computer system 110 may generate and send first control information to instruct MP entity 130 and/or LM1 131 to cause injection of first health check packet (P1) 190 on host-A 210A. In response, MP entity 130 and/or LM1 131 may instruct host-A 210A to generate and inject P1 190 for forwarding between VM1 231 and external endpoint 280. P1 190 may be injected at source logical port=LP1 265 or VNIC1 261 in FIG. 2. Here, P1 190 may be configured to specify a flag indicating that it is a health check packet (i.e., not a regular packet) to trigger report information from observation point(s). See 430-435 in FIGS. 4 and 180-182 in FIGS. 1-2.

P1 190 may also include an inner packet specifying source information (IP address=IP-1) associated with VM1 231, and destination information (e.g., IP-S) associated with external endpoint 280. In practice, host-A 210A and EDGE 270 may be connected via a logical overlay network. In this case, to reach EDGE 270, P1 190 may be encapsulated with an outer header (e.g., GENEVE encapsulation) specifying VTEP information associated with host-A 210A and EDGE 270.

In relation to the second flow, computer system 110 may generate and send first control information to instruct MP entity 130 and LM2 132 to cause injection of second health check packet (P2) 191 on host-B 210B. In response, MP entity 130 and/or LM2 132 may instruct host-B 210B to generate and inject second health check packet 191 for forwarding along a datapath between VM2 232 and VM3 233. P2 191 may be injected at source logical port=LP3 267 or VNIC3 263 in FIG. 2. Similarly, P2 191 may be configured to specify a flag indicating that it is a health check packet to trigger report information from observation point (s). See 430-435 in FIGS. 4 and 180, 183-184 in FIGS. 1-2.

P2 191 may also include an inner packet specifying source information (IP-3) associated with VM3 233, and destination information (IP-2) associated with VM2 232. Host-A 210A and host-B 210B may be connected via a logical overlay network. In this case, to reach host-A 210A, P2 191 may be encapsulated with an outer header specifying source and destination VTEP information.

(b) Observation Points

At 440-445 in FIG. 4, in response to detecting health packet 190/191, an observation point may generate and send report information to computer system 110 directly, or via management entity 130/131/132. For example, the report information may be in the form of (flow ID, OP ID, status). The "flow ID" may be any suitable information identifying a particular $F_i$ from subset 170. The "OP ID" may include any suitable information identifying its sender observation point, such as a unique ID, name, type (e.g., physical entity, logical switch port, logical switch, logical router port, logical router, distributed firewall, gateway, etc.). The "status" may be "RECEIVED," "FORWARDED," "DELIVERED," "DROPPED," etc. If the health check packet is dropped, a reason may be provided (where available). The report information may also include a timestamp.

As used herein, the term "observation point" may refer generally to any suitable entity or node that is located along a datapath between a pair of endpoints. An entity may be a physical entity, such as a host, physical switch, physical router, etc. Alternatively, an entity may be a logical entity, such as a logical port, VNIC, distributed firewall, logical forwarding element (e.g., logical switch, logical router, tier-1 gateway, tier-0 gateway), etc. A combination of physical and logical entities may be used as observation points. Health check packet 190/191 may be sent over direct connect, virtual private cloud (VPC), virtual private network (VPN), the Internet, SDDC grouping, site recovery manager (SRM), hybrid cloud extension (HCX), etc.

Observation point(s) may send the report information to computer system 110 via one or more management entities 130-132. For example, LM 131/132 may aggregate report information from various observation points, and send an aggregated or consolidated report to computer system 110. The report information may be provided to network analytics engine 120 for storage and access by any other entity.

Example Health Status Information

At 450-455 in FIG. 4, in response to receiving the report information, computer system 110 may determine a health status associated with each flow ($F_i$) in subset 170, such as HEALTHY (i.e., successfully delivered or destination reachable) or UNHEALTHY (i.e., dropped or destination not reachable). At 460-470, in response to determination that flow ($F_i$) is associated with status=UNHEALTHY (e.g., dropped), computer system 110 may initiate remediation action(s) for flow ($F_i$) by notifying SRE engine 104 in FIG. 1. See also 475 in FIG. 4.

(a) Status=Healthy

Figure 5:
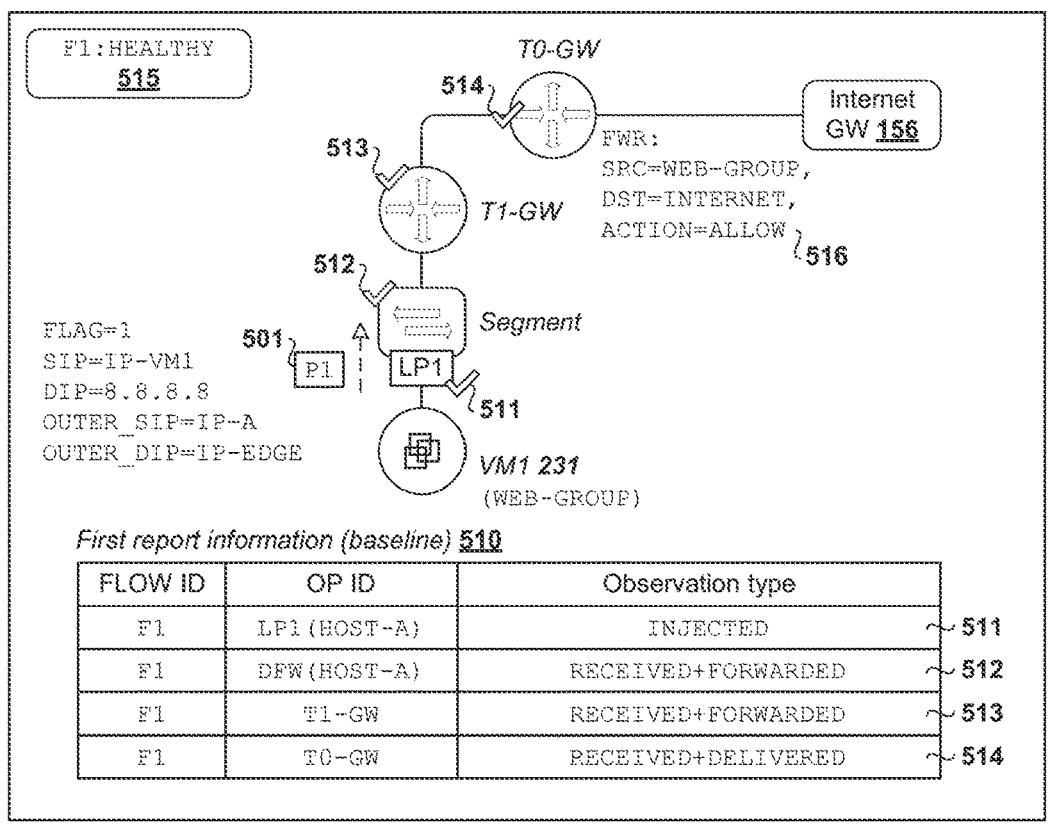
FIG. 5 is a schematic diagram illustrating first example health check as a service and health status information.
Figure 5:
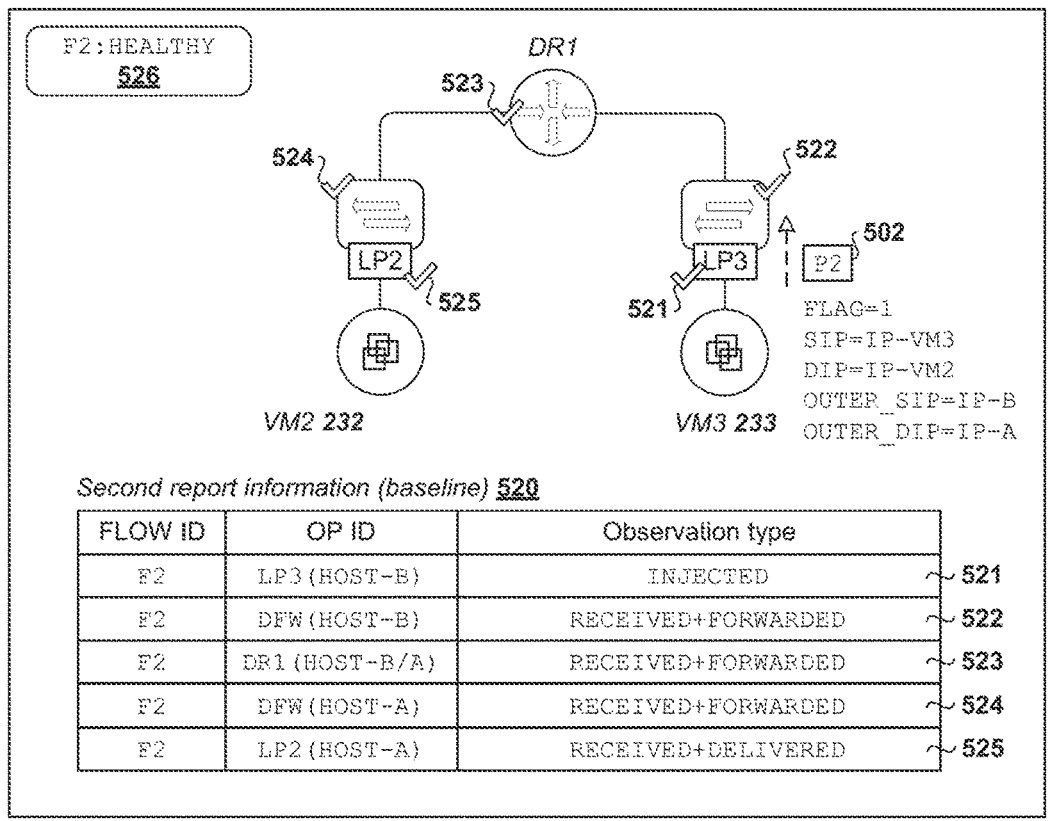

FIG. 5 is a schematic diagram illustrating first example 500 of health check as a service and health status information. In one scenario, first example 500 in FIG. 5 may be performed prior to a software deployment (e.g., upgrade or greenfield) or for an on-demand health check at time=T0.

In relation to the first flow between source=VM1 231 and destination=8.8.8.8 (i.e., Internet), computer system 110 may receive first report information 510 triggered by first health check packet (P1) 501 as it traverses along a north-south traffic datapath. P1 501 includes a flag=1 to indicate that it is a health check packet and to cause observation points to generate and send first report information 510. Example observation points may include source logical port=LP1 251 at which P1 501 is injected, DFW engine 218A on host-A 210A, a tier-1 gateway (T1-GW) implemented by host-A 210A and/or EDGE 270, and tier-0 gateway (T0-GW) implemented by EDGE 270. Based on first report information 510, computer system 110 may determine a first health status=HEALTHY associated with the first flow. See 511-515 in FIG. 5.

In relation to the second flow between source=VM3 233 and destination=VM2 232, computer system 110 may receive second report information 510 triggered by second health check packet (P2) 502 as it traverses along an east-west traffic datapath. Example observation points capable of generating and sending second report information 520 may include source logical port=LP3 253 at which P2 502 is injected, DFW engine 218B on source host-B 210B, a logical router (DR) connecting VM3 233 and VM2 232, DFW engine 218A on destination host-A 210A, destination logical port=LP2 252 to which VM2 232 is connected, etc. Based on second report information 520, computer system 110 may determine a second health status=HEALTHY associated with the second flow. See 521-525 in FIG. 5.

(b) Status=Unhealthy

Figure 6:
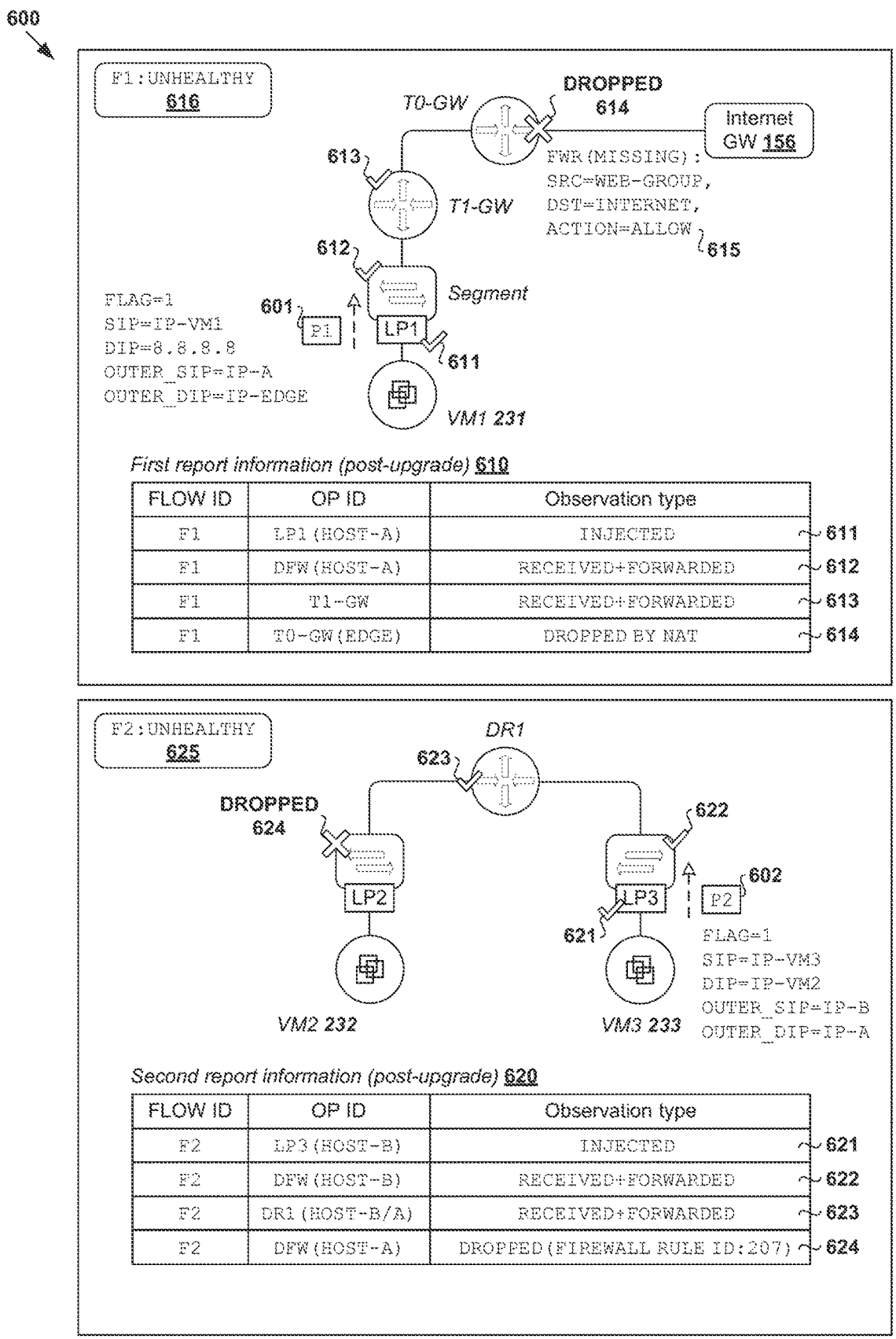
FIG. 6 is a schematic diagram illustrating second example health check as a service and health status information.

FIG. 6 is a schematic diagram illustrating second example 600 of health check as a service and health status information. Second example 600 in FIG. 6 may be performed after a software upgrade or on an on-demand basis at a later time=T1>T0. In relation to the first flow, computer system 110 may receive first report information 610 triggered by P1 601. Compared to FIG. 5, P1 601 in FIG. 6 has been successfully forwarded from LP1 251 to EDGE 270, but eventually dropped by T0-GW implemented by EDGE 270 (see 611-614). For example, report information 614 from EDGE 270 may specify (flow ID=F1, OP ID=T0-GW, status=DROPPED BY NAT). Based on first report information 611-614, computer system 110 may determine a first health status=UNHEALTHY associated with the first flow (see 616).

In this example, the connectivity loss between VM1 231 (i.e., member of a web server group) and the Internet may be caused by missing firewall rule configuration (see 515 in FIGS. 5 and 615 in FIG. 6) after a software upgrade. This results in P1 601 from VM1 231 being dropped instead of allowed to access the Internet. In response to the determination of first health status=UNHEALTHY, computer system 110 may initiate remediation action(s) by generating and sending a notification to SRE engine 104.

In relation to the second flow, computer system 110 may receive second report information 620 triggered by P2 602. Compared to FIG. 5, P2 602 in FIG. 6 has been successfully forwarded from host-B 210B to host-A 210B but eventually dropped by host-A 210A (see 621-624). For example, report information 624 from DFW engine 218A on host-A 210A may specify (flow ID=F2, OP ID=DFW, status=DROPPED FIREWALL RULE ID: 207). Based on second report information 621-624, computer system 110 may determine a second health status=UNHEALTHY associated with the second flow (see 625). The connectivity loss may be caused by firewall misconfiguration on DFW engine 218A. In response to the determination of first health status=UNHEALTHY, computer system 110 may initiate remediation action(s) by generating and sending a notification to SRE engine 104.

Depending on the desired granularity, additional items in report information 510/520/610/620 may include transport node information (ID, name, type=host 210A/210B or EDGE 270), observation point or component information (e.g., physical, DFW, logical switch, logical port, logical router, gateway, tunnel, NAT, cloud gateway, etc.), logical port information, timestamp information, sequence number, etc. Any alternative and/or additional observation points may be configured.

Health Check as a Service for Software Upgrades

Block 480 in FIG. 4 will be described using FIG. 7, which is a schematic diagram illustrating example 700 of health check as a service associated with a software deployment with multiple (X) phases. In practice, a software deployment may include multiple phases to roll out different features to different network planes. Using x=1, . . . , X phases, control plane upgrades may be performed during a first phase (x=1), data plane upgrades during a second phase (x=2), appliance upgrades during a third phase (x=3), and so on. Deployment coordinator 101 may schedule the multiple phases to start at different times according to a first timeline (see 701). To reduce the impact and downtime caused by the software upgrade, deployment coordinator 101 may interact with computer system 110 to initiate multiple health checks according to a second timeline (see 702).

Figure 7:
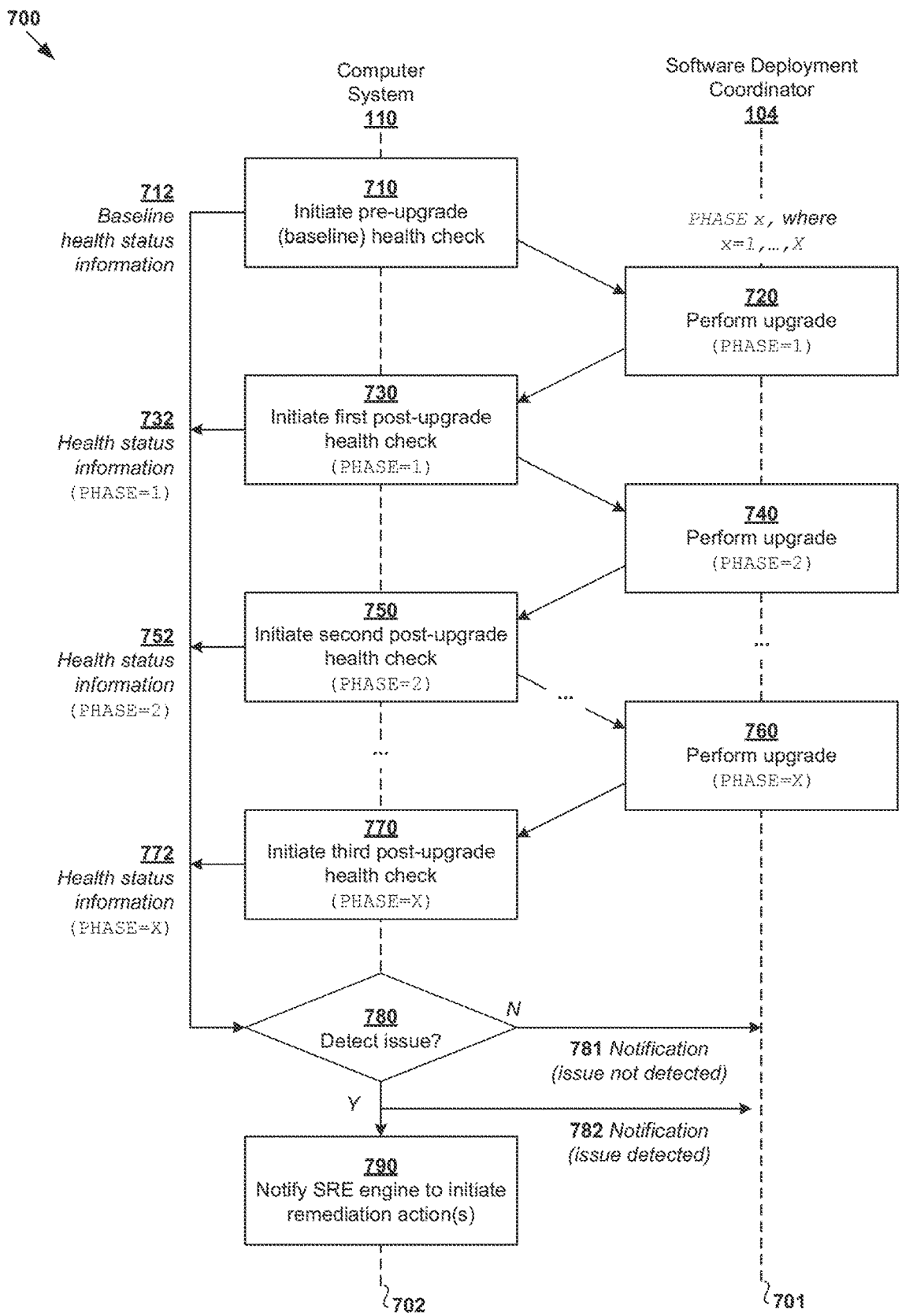
FIG. 7 is a schematic diagram illustrating example health check as a service associated with a software upgrade with multiple phases.

At 710 in FIG. 7, computer system 110 may initiate a baseline (i.e., pre-upgrade) health check to cause injection of health check packets. Based on report information from observation point(s), computer system 110 may determine baseline health status information before a software deployment starts. See 712 in FIG. 7.

At 720 in FIG. 7, deployment coordinator 101 may initiate a first phase of the software upgrade. For example, the first phase may involve performing upgrades relate to the control plane, such as firewall rule configuration, certificate update, EDGE 270 configuration, maintenance tasks, etc. After the first phase is completed, at 730, computer system 110 may initiate a first post-upgrade health check for multiple flows selected in subset 170 to cause injection of health check packets. Based on report information from observation point(s), computer system 110 may determine first post-upgrade health status information associated with subset 170. See 732 in FIG. 7.

At 740 in FIG. 7, deployment coordinator 101 may initiate a second phase of the software upgrade. At 750, computer system 110 may initiate a second post-upgrade health check. Based on report information from observation point(s), computer system 110 may determine second post-upgrade health status information associated with subset 170. See 752 in FIG. 7.

Any suitable upgrade operations according to block 720/740 and post-upgrade health check according to block 730/750 may be performed for subsequent phase (x<X). Then, at 760 in FIG. 7, deployment coordinator 101 may initiate an $X^{th}$ phase of the software upgrade. At 770, computer system 110 may initiate an $X^{th}$ post-upgrade health check for multiple flows selected in subset 170. Based on report information from observation point(s), computer system 110 may determine $X^{th}$ post-upgrade health status information associated with subset 170. See 772 in FIG. 7.

At 780-790 in FIG. 7, in response to detecting any issue based on health information 712/732/752/772, computer system 110 may initiate remediation action(s), such as by generating and sending a notification to SRE engine 104 in FIG. 1. The network issues detected at runtime may be caused by changes to the software stack, etc. Using examples of the present disclosure, health checks may be performed after each phase of the software deployment to identify and detect any network issues.

Example network issues that are detectable based on health status information may include traffic impact over firewall rule missing over virtual tunnel interface (VTI) associated with a route-based VPN (RBVPN) connection, firewall implementation change post upgrade, missing routing information at a gateway, border gateway protocol (BGP) session down after upgrade, VM connection being dropped after migration, missing firewall rule(s) for Active Directory (AD) or Lightweight Directory Access Protocol (LDAP), compute gateway (CGW) forwarder not resolving domain, etc.

Group-Based Health Checks

According to examples of the present disclosure, computer system 110 may be configured to identify multiple groups in network environment 100/200 to facilitate group-based health checks and software deployment. Some examples will be described using FIG. 8, which is a schematic diagram illustrating example health check as a service associated with multiple groups.

Figure 8:
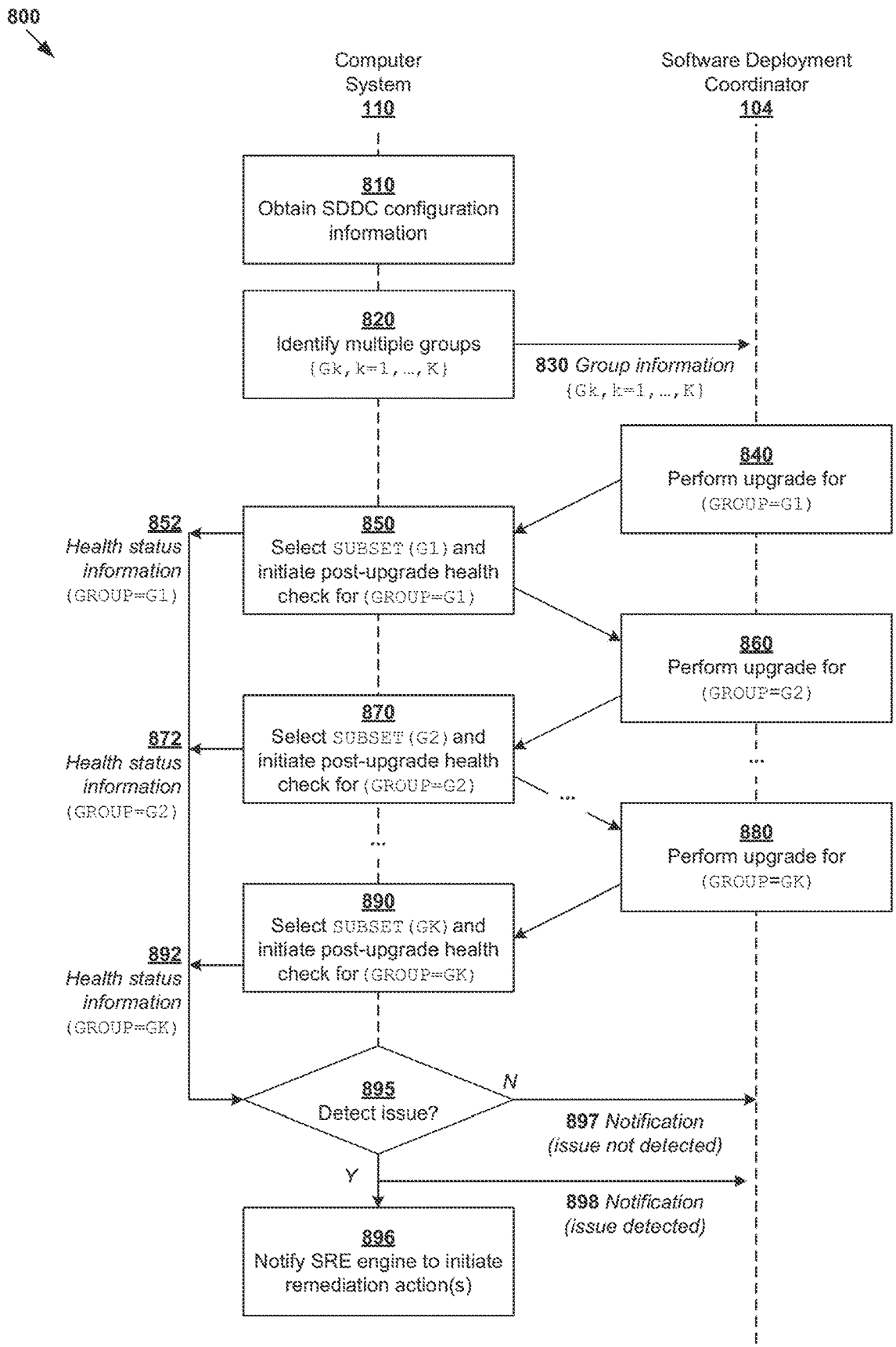
FIG. 8 is a schematic diagram illustrating example health check as a service associated with multiple groups of a software-defined data center (SDDC).

At 810 in FIG. 8, computer system 110 may obtain, from time to time, SDDC configuration information associated with network environment 100, such as fleet-wise configuration information identifying various entities deployed, service configuration information identifying services installed, firewall rule configuration information identifying firewall rules, etc. The fleet-wise configuration information may specify the number of hosts, host clusters, application(s) installed on the hosts, logical or physical network elements configured, etc.

At 820 in FIG. 8, based on flow information 121 and the SDDC configuration information, computer system 110 may determine multiple (K) SDDC groups within network environment 100. Each SDDC group may be denoted as $G_k$ (where k∈1, ..., K) and include one or more entities (e.g., hosts, VMs, logical network elements, physical network elements, etc.).

At 830 in FIG. 8, computer system 110 may send group information identifying {$G_k$, k=1, ..., K} to deployment coordinator 101. At 840/860/880, based on the group information, deployment coordinator 101 may initiate a group-based software deployment process according to a deployment plan for each group in any desired order. For example, a software upgrade may be initiated for a first group ($G_1$), followed by a second group ($G_2$), and so on until all K groups are upgraded.

After the upgrade for each group ($G_k$) is completed, deployment coordinator 101 may initiate a post-upgrade health check associated with the group ($G_k$) by generating and sending a request to computer system 110. At 850/870/890 in FIG. 8, in response to receiving the request from deployment coordinator 101, computer system 110 may select a subset of flows associated with the group ($G_k$) and initiate a kth post-upgrade health check associated with the group ($G_k$).

For example, first health check packet (P1) 190 in FIG. 1 may be injected for a post-upgrade health check associated with a first group ($G_1$). Second health check packet (P2) 191 may be injected for a post-upgrade health check associated with a second group ($G_2$). Example implementation details that have been described using FIGS. 1-7 are applicable here and will not be repeated here for brevity. For each group ($G_k$), health status information 852/872/892 may be determined based on report information from observation point(s). At At 895-896 in FIG. 8, in response to detecting any issue based on health information 852/872/892, computer system 110 may initiate remediation action(s), such as by generating and sending a notification to SRE engine 104 in FIG. 1. At 897-898, computer system 110 may report the health status information associated with the group ($G_k$) to deployment coordinator 101. This way, any post-upgrade issue that affecting a particular group or version path may be addressed before another group is upgraded. This also reduces the risk of, if not prevents, the issue from affecting another group with similar configurations. See also 490 in FIG. 4.

Container Implementation

Although explained using VMs, it should be understood that public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 8, container technologies may be used to run various containers inside respective VMs 231-234. Containers are "OS-less", meaning that they do not include any OS that could weigh 10$s$ of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 8. For example, the instructions or program code, when executed by the processor of the computer system, may cause the processor to implement a "network device" or "computer system" to perform health check as a service according to examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

What is claimed is:

1. A method, comprising:
    receiving, at a computer system and from a requesting entity separate from the computer system, a request to perform a health check for a network environment associated with a set of multiple flows;
    obtaining, with the computer system and from a network analytics engine, flow information associated with a set of multiple flows;
    selecting, with the computer system and from the set of multiple flows, a subset for the health check, wherein the subset includes (a) a first flow between a first endpoint comprising a first virtualized computing instance (VCI) and a second endpoint and (b) a second flow between a third endpoint comprising a second VCI and a fourth endpoint;
    initiating, with the computer system, the health check for the subset by generating and sending (a) a first instruction to a first management entity to instruct a first host to inject first health check packet for forwarding between the first pair of endpoints of the first flow, and (b) a second instruction to the first management entity or a second management entity to instruct a second host to inject a second health check packet for forwarding between the second pair of endpoints of the second wherein each of the first management entity and the second management entity is a management plane entity or a control plane entity, the first endpoint executes on the first host, and the third endpoint executes on the second host;
    receiving, at the computer system, first report information, generated by a first observation point on a data path between the first endpoint and the second endpoint and triggered by the first health check packet, and second report information, generated by a second observation point or the first observation point on a data path between the third endpoint and the fourth endpoint and triggered by the second health check packet; and
    determining, at the computer system and based at least in part on the first report information and the second report information, health status information associated with the subset.

2. The method of claim 1, wherein selecting the subset comprises:
    processing the flow information associated with the set of multiple flows according to an on-time prioritization rule to determine whether the first flow or the second flow is frequently used, actively used or recently used within a predetermined time frame.

3. The method of claim 1, wherein selecting the subset comprises:
    processing the flow information associated with the set of multiple flows according to a confidence level rule to determine whether a confidence level associated with the first flow or the second flow exceeds a threshold.

4. The method of claim 1, wherein selecting the subset comprises:
    processing the flow information associated with the set of multiple flows to determine whether the first flow or the second flow is a substantially critical flow based on one or more firewall rules.

5. The method of claim 1, wherein the method further comprises:
    based on the health status information indicating that the first flow or the second flow is associated with an unhealthy status, generating and sending a notification to a site recovery engineering (SRE) entity to initiate one or more remediation actions.

6. The method of claim 1, wherein initiating the health check comprises:
    initiating the health check after completion of a particular phase of a software deployment that includes multiple phases, wherein the request is received from a software deployment coordinator.

7. The method of claim 1, wherein initiating the health check comprises:
    processing the flow information associated with the set of multiple flows to identify multiple groups in the network environment; and
    initiating the health check to determine health status information associated with the subset that is associated with a particular group from the multiple groups.

8. A non-transitory computer-readable storage medium that includes a set of instructions which, in response to execution by a processor of a computer system, cause the computer system to perform operations comprising:
    receiving, at the computer system and from a requesting entity separate from the computer system, a request to perform a health check for a network environment associated with a set of multiple flows;
    obtaining, with the computer system and from a network analytics engine, flow information associated with a set of multiple flows;
    selecting, with the computer system and from the set of multiple flows, a subset for the health check, wherein the subset includes (a) a first flow between a first endpoint comprising a first virtualized computing instance (VCI) and a second endpoint and (b) a second flow between a third endpoint comprising a second VCI and a fourth endpoint;
    initiating, with the computer system, the health check for the subset by generating and sending (a) a first instruction to a first management entity to instruct a first host to inject first health check packet for forwarding between the first pair of endpoints of the first flow, and (b) a second instruction to the first management entity or a second management entity to instruct a second host to inject a second health check packet for forwarding between the second pair of endpoints of the second wherein each of the first management entity and the second management entity is a management plane entity or a control plane entity, the first endpoint executes on the first host, and the third endpoint executes on the second host;

receiving, at the computer system, first report information, generated by a first observation point on a data path between the first endpoint and the second endpoint and triggered by the first health check packet, and second report information, generated by a second observation point or the first observation point on a data path between the third endpoint and the fourth endpoint and triggered by the second health check packet; and determining, at the computer system and based at least in part on the first report information and the second report information, health status information associated with the subset.

9. The non-transitory computer-readable storage medium of claim 8, wherein selecting the subset comprises:

processing the flow information associated with the set of multiple flows according to an on-time prioritization rule to determine whether the first flow or the second flow is frequently used, actively used or recently used within a predetermined time frame.

10. The non-transitory computer-readable storage medium of claim 8, wherein selecting the subset comprises:

processing the flow information associated with the set of multiple flows according to a confidence level rule to determine whether a confidence level associated with the first flow or the second flow exceeds a threshold.

11. The non-transitory computer-readable storage medium of claim 8, wherein selecting the subset comprises:

processing the flow information associated with the set of multiple flows to determine whether the first flow or the second flow is a substantially critical flow based on one or more firewall rules.

12. The non-transitory computer-readable storage medium of claim 8, wherein the operations further comprise:

based on the health status information indicating that the first flow or the second flow is associated with an unhealthy status, generating and sending a notification to a site recovery engineering (SRE) entity to initiate one or more remediation actions.

13. The non-transitory computer-readable storage medium of claim 8, wherein initiating the health check comprises:

initiating the health check after completion of a particular phase of a software deployment that includes multiple phases, wherein the request is received from a software deployment coordinator.

14. The non-transitory computer-readable storage medium of claim 8, wherein initiating the health check comprises:

processing the flow information associated with the set of multiple flows to identify multiple groups in the network environment; and initiating the health check to determine health status information associated with the subset that is associated with a particular group from the multiple groups.

15. A computer system, comprising:
a processor; and
a non-transitory computer-readable storage medium that includes a set of instructions which, in response to execution by the processor, cause the computer system to perform operations comprising:

receiving, at the computer system and from a requesting entity separate from the computer system, a request to perform a health check for a network environment associated with a set of multiple flows;

obtaining, with the computer system and from a network analytics engine, flow information associated with a set of multiple flows;

selecting, with the computer system and from the set of multiple flows, a subset for the health check, wherein the subset includes (a) a first flow between a first endpoint comprising a first virtualized computing instance (VCI) and a second endpoint and (b) a second flow between a third endpoint comprising a second VCI and a fourth endpoint;

initiating, with the computer system, the health check for the subset by generating and sending (a) a first instruction to a first management entity to instruct a first host to inject first health check packet for forwarding between the first pair of endpoints of the first flow, and (b) a second instruction to the first management entity or a management second entity to instruct a second host to inject a second health check packet for forwarding between the second pair of endpoints of the second wherein each of the first management entity and the second management entity is a management plane entity or a control plane entity, the first endpoint executes on the first host, and the third endpoint executes on the second host;

receiving, at the computer system, first report information, generated by a first observation point on a data path between the first endpoint and the second endpoint and triggered by the first health check packet, and second report information, generated by a second observation point or the first observation point on a data path between the third endpoint and the fourth endpoint and triggered by the second health check packet; and determining, at the computer system and based at least in part on the first report information and the second report information, health status information associated with the subset.

16. The computer system of claim 15, wherein selecting the subset comprises:

processing the flow information associated with the set of multiple flows according to an on-time prioritization rule to determine whether the first flow or the second flow is frequently used, actively used or recently used within a predetermined time frame.

17. The computer system of claim 15, wherein selecting the subset comprises:

processing the flow information associated with the set of multiple flows according to a confidence level rule to determine whether a confidence level associated with the first flow or the second flow exceeds a threshold.

18. The computer system of claim 15, wherein selecting the subset comprises:

processing the flow information associated with the set of multiple flows to determine whether the first flow or the second flow is a substantially critical flow based on one or more firewall rules.

19. The computer system of claim 15, wherein the operations further comprise:

based on the health status information indicating that the first flow or the second flow is associated with an unhealthy status, generating and sending a notification to a site recovery engineering (SRE) entity to initiate one or more remediation actions.

20. The computer system of claim 15, wherein initiating the health check comprises:
   initiating the health check after completion of a particular phase of a software deployment that includes multiple phases, wherein the request is received from a software deployment coordinator.

21. The computer system of claim 15, wherein initiating the health check comprises:
   processing the flow information associated with the set of multiple flows to identify multiple groups in the network environment; and
   initiating the health check to determine health status information associated with the subset that is associated with a particular group from the multiple groups.

* * * * *